United States Patent
Ogata (12) United States Patent (10) Patent No.: US 9,683,915 B2
(45) Date of Patent: Jun. 20, 2017

(54) INSPECTION DEVICE

(71) Applicant: Yuuki Ogata, Shizuoka (JP)

(72) Inventor: Yuuki Ogata, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/783,639

(22) PCT Filed: Mar. 14, 2014

(86) PCT No.: PCT/JP2014/056932
§ 371 (c)(1),
(2) Date: Oct. 9, 2015

(87) PCT Pub. No.: WO2014/167942
PCT Pub. Date: Oct. 16, 2014

(65) Prior Publication Data
US 2016/0299034 A1    Oct. 13, 2016

(30) Foreign Application Priority Data

Apr. 12, 2013  (JP) .................................. 2013-083833

(51) Int. Cl.
G01M 13/04    (2006.01)

(52) U.S. Cl.
CPC .................................. *G01M 13/045* (2013.01)

(58) Field of Classification Search
CPC ................ G01M 13/04; G01M 13/045; G01N 2291/2696

(Continued)

(56) References Cited

U.S. PATENT DOCUMENTS 4,763,523 A * 8/1988 Womble ................. G01N 29/14
340/682
5,072,611 A   12/1991 Budd et al.
(Continued)

FOREIGN PATENT DOCUMENTS

DE    2 222 000    11/1973
DE    34 36 268    4/1986
(Continued)

OTHER PUBLICATIONS

International Preliminary Report on Patentability and Written Opinion of the International Searching Authority issued Oct. 13, 2015 in International Application No. PCT/JP2014/056932. (English Translation).

(Continued)

*Primary Examiner* — J M Saint Surin
(74) *Attorney, Agent, or Firm* — Wenderoth, Lind & Ponack, L.L.P.

(57) ABSTRACT

Provided is an inspection device, including: pressurizing means for pressurizing an outer member of a rolling bearing toward an inner member of the rolling bearing, the rolling bearing including the outer member and the inner member rotatable relative to each other through intermediation of balls; rotary drive means for rotating the inner member about an axial center of the inner member under a state in which the outer member is pressurized toward the inner member; detecting means for detecting vibration generated along with the rotation of the inner member so that whether or not the rolling bearing is an accepted product is determined based on values obtained through the detection; and vibration control means to be interposed between the outer member and the pressurizing means, the vibration control means including a holding portion configured to hold the detecting means in a fixed manner.

14 Claims, 4 Drawing Sheets

(58) Field of Classification Search
USPC .......................................................... 73/593
See application file for complete search history.

(56) References Cited

U.S. PATENT DOCUMENTS

| | | | |
|---|---|---|---|
| 5,263,372 A | 11/1993 | Matsuzaki et al. | |
| 5,517,858 A | 5/1996 | Matsuzaki et al. | |
| 6,293,151 B1 | 9/2001 | Kawamata et al. | |
| 6,471,407 B1 | 10/2002 | Katano | |
| 6,580,186 B1 * | 6/2003 | Suzuki | F16C 17/026 310/51 |
| 7,107,850 B2 * | 9/2006 | Maeda | F16C 19/527 384/513 |
| 2002/0097040 A1 | 7/2002 | Takizawa et al. | |
| 2007/0210654 A1 * | 9/2007 | Ueda | H02K 7/04 310/51 |
| 2016/0054198 A1 * | 2/2016 | Taguchi | G01M 13/04 73/593 |

FOREIGN PATENT DOCUMENTS

| | | | |
|---|---|---|---|
| DE | 20 2008 010 351 | | 1/2009 |
| GB | 2319814 | * | 6/1998 |
| JP | 61188714 | * | 8/1986 |
| JP | 5-10835 | | 1/1993 |
| JP | 5-126628 | | 5/1993 |
| JP | 7-103815 | | 4/1995 |
| JP | 9-178613 | | 7/1997 |
| JP | 10221161 | * | 8/1998 |
| JP | 2000-292314 | | 10/2000 |
| JP | 2004-61151 | | 2/2004 |
| JP | 2005-172717 | | 6/2005 |
| JP | 2007-93544 | | 4/2007 |
| JP | 2010-175511 | | 8/2010 |
| JP | 2010-237033 | | 10/2010 |

OTHER PUBLICATIONS

International Search Report issued May 13, 2014 in International (PCT) Application No. PCT/JP2014/056932.
Extended European Search Report issued Nov. 9, 2016 in corresponding European Application No. 14782699.4.

* cited by examiner

INSPECTION DEVICE

TECHNICAL FIELD

The present invention relates to an inspection device for rolling bearings, and more particularly, to an inspection device to be used for detecting vibration generated along with rotation of rolling bearings (relative rotations between an outer member and an inner member of each of the rolling bearings), and determining, based on values obtained through the detection, whether or not the rolling bearings being objects to be inspected are accepted products.

BACKGROUND ART

For the purpose of providing highly reliable rolling bearings each having high bearing performance and a long durability life, in a flow of manufacturing the rolling bearings, normally, vibration characteristics of the rolling bearings are inspected. For example, in Patent Literature 1, there is disclosed technical means for inspecting vibration characteristics of double-row rolling bearings each including an outer ring serving as an outer member having double-row outer raceway surfaces, inner rings serving as inner members having double-row inner raceway surfaces, and rolling elements interposed between the outer raceway surfaces and the inner raceway surfaces in pairs.

Specifically, in Patent Literature 1, there is disclosed an inspection method involving a first measuring step of fixing the outer ring, rotating an inner ring under a state in which the inner ring is pressurized in an axial direction (pressed toward the outer ring), and measuring vibration of a raceway surface on one end portion side of the outer ring in the axial direction during the rotation of the inner ring, and a second measuring step of fixing the outer ring, rotating another inner ring under a state in which the another inner ring is pressurized in the axial direction, and measuring vibration of a raceway surface on another end portion side of the outer ring in the axial direction during the rotation of the another inner ring. This inspection method is performed by using, for example, an inspection device including fixing means for removably fixing the end portion side of the outer ring in the axial direction, pressurizing means for applying a pressing force in the axial direction to the inner ring, rotary drive means for rotating the inner ring, which is pressurized by the pressurizing means, about an axial center thereof, and vibration measuring means for measuring vibration of the raceway surface on the another end portion side of the outer ring in the axial direction, which is not fixed by the fixing means during the rotation of the inner ring.

CITATION LIST

Patent Literature 1: JP 2010-175511 A

SUMMARY OF INVENTION

Technical Problem

The technical means of Patent Literature 1 is advantageous in that highly reliable rolling bearings can be provided, but there is still room for improvement. Specifically, a cylinder rod (pressurizing means) including a fitting portion configured to fit to the inner rings is coupled to an output shaft of a motor (rotary drive means) through intermediation of torque detecting means. Thus, vibration generated along with rotation of the motor is liable to be transmitted to the rolling bearing being an object to be inspected. Further, the inspection device of this type is used practically under a state of being arranged adjacently to other manufacturing apparatus such as an assembly apparatus. Thus, vibration generated by operation of the other manufacturing apparatus is liable to be transmitted not only to the inspection device, but also to the rolling bearing being the object to be inspected, which is held by the inspection device. For those reasons, the technical means of Patent Literature 1 has a difficulty in accurately inspecting the vibration characteristics of the rolling bearings. As a result, rejected products that do not meet acceptance criteria may be mixed in a group of accepted products. In contrast, rolling bearings that actually need to be determined as accepted products may be determined as rejected products. In such cases, re-inspections and corrections that are normally unnecessary are performed, with the result that production efficiency is deteriorated.

In view of such circumstances, it is an object of the present invention to provide an inspection device capable of inspecting vibration characteristics of rolling bearings with high accuracy so that highly reliable rolling bearings can be efficiently manufactured.

Solution to Problem

According to one embodiment of the present invention, which is devised to attain the above-mentioned object, there is provided an inspection device, comprising: pressurizing means for pressurizing one of an outer member and an inner member of a rolling bearing toward another one of the outer member and the inner member, the rolling bearing comprising: rolling elements; and the outer member and the inner member rotatable relative to each other through intermediation of the rolling elements; rotary drive means arranged apart from the pressurizing means, for rotating the another one of the outer member and the inner member about an axial center of the another one of the outer member and the inner member under a state in which the one of the outer member and the inner member is pressurized toward the another one of the outer member and the inner member; detecting means for detecting vibration generated in the one of the outer member and the inner member along with the rotation of the another one of the outer member and the inner member so that whether or not the rolling bearing is an accepted product is determined based on values obtained through the detection; and vibration control means to be interposed between the pressurizing means and the one of the outer member and the inner member, the vibration control means comprising a holding portion configured to hold the detecting means in a fixed manner.

Note that, the "rolling bearing" in the present invention is not particularly limited as long as the outer member and the inner member are assembled to each other under a state in which relative rotations are allowed therebetween through intermediation of the rolling elements. In other words, the "rolling bearing" herein conceptually includes not only a rolling bearing being a completed product (final product), but also an assembly formed by assembling the outer member and the inner member to each other to attain the state in which the relative rotations are allowed therebetween through intermediation of the rolling elements.

In the inspection device according to the one embodiment of the present invention, the pressurizing means for pressurizing the one of the outer member and the inner member toward the another one of the outer member and the inner member, and the rotary drive means for rotating the another one of the outer member and the inner member about the axial center of the another one of the outer member and the inner member are arranged apart from each other. In addition, the vibration control means is interposed between the pressurizing means and the one of the outer member and the inner member. With this, vibration generated due to the drive of the driven rotary drive means, and vibration generated in other manufacturing apparatus arranged adjacently to the inspection device are less liable to be transmitted to the one of the outer member and the inner member, which is an object to be inspected. Further, the detecting means is held in a fixed manner by the holding portion provided in the vibration control means, and hence vibration of the detecting means itself can be prevented as much as possible. In this way, the inspection device according to the one embodiment of the present invention is capable of effectively suppressing both the detecting means and the one of the outer member and the inner member, which is a substantial object to be inspected in the rolling bearing being an object to be inspected, from being influenced by disturbance vibration. Thus, vibration characteristics of the rolling bearing can be inspected with high accuracy.

The inspection device according to the one embodiment of the present invention may further comprise a support member configured to support the one of the outer member and the inner member. In this case, the detecting means may be held in a fixed manner by the holding portion of the vibration control means under a state in which a detecting element of the detecting means is held in contact with or proximity to the support member. In this way, when the vibration generated in the one of the outer member and the inner member is detected through intermediation of the support member, it is preferred that the support member be formed into a shape capable of supporting the one of the outer member and the inner member at a plurality of (specifically, three) circumferential positions. This is because, in comparison with a case where the one of the outer member and the inner member is supported over an entire circumference, vibration of the rolling bearing being the object to be inspected is more efficiently transmitted to the support member so that the vibration can be detected with higher accuracy.

The rotary drive means may comprise a fluid dynamic bearing (for example, pneumatic spindle) configured to support the rotation of the another one of the outer member and the inner member in a non-contact manner with respect to a stationary side. This is because, although the rotation of the another one of the outer member and the inner member can be supported, for example, by the rolling bearing, in this case, accurate inspection of vibration characteristics of the rolling bearing being the object to be inspected may be difficult due to vibration generated by operation of the rolling bearing.

The inspection device according to the one embodiment of the present invention may further comprise: a frame member configured to hold the pressurizing means and the rotary drive means in a fixed manner; and a support base configured to support this frame member from below. In this case, other vibration control means may be interposed between the frame member and the support base. With this, in particular, vibration generated outside the inspection device can be damped by the other vibration control means. Thus, disturbance vibration is much less liable to be transmitted to the rolling bearing being the object to be inspected and the detecting means. As a result, the vibration characteristics of the rolling bearing can be inspected with much higher accuracy.

In order to quantitatively grasp the vibration, any one of physical quantities of an acceleration ($m/s^2$), a speed (m/s), or a displacement (m) is used, and those physical quantities can be converted to each other through differentiation or integration. Thus, when any one of an acceleration sensor capable of detecting the acceleration, a speed sensor capable of detecting the speed, and a displacement sensor capable of detecting the displacement is used as the detecting means, the vibration can be quantitatively grasped.

In the configuration of the inspection device according to the one embodiment of the present invention, the pressurizing means needs to comprise a mechanism capable of pressurizing the one of the outer member and the inner member toward the another one of the outer member and the inner member, in other words, a mechanism configured to extend and retract parallel to an axial line of the rolling bearing being the object to be inspected. As a mechanism of this type, a spring mechanism or a cylinder mechanism may be employed. In particular, when the cylinder mechanism is employed, a pressing force to be applied to the one of the outer member and the inner member can be adjusted only by adjusting an amount of extension and retraction (stationary position) of a rod. Thus, there is an advantage of high compatibility with, for example, changes of the rolling bearing being the object to be inspected.

The inspection device according to the one embodiment of the present invention is capable of inspecting all types of rolling bearings each comprising the rolling elements, and the outer member and the inner member rotatable relative to each other through intermediation of the rolling elements. Specifically, the inspection device according to the one embodiment of the present invention is capable of inspecting, irrespective of a single row or a double row, rolling bearings such as a ball bearing, a needle roller bearing, a cylindrical roller bearing, and a tapered roller bearing.

As described above, according to the inspection device of the one embodiment of the present invention, the vibration characteristics of the rolling bearings can be inspected with high accuracy. With this, highly reliable rolling bearings can be efficiently manufactured.

DESCRIPTION OF EMBODIMENTS

Now, description is made of embodiments of the present invention with reference to the drawings.

Figure 1:
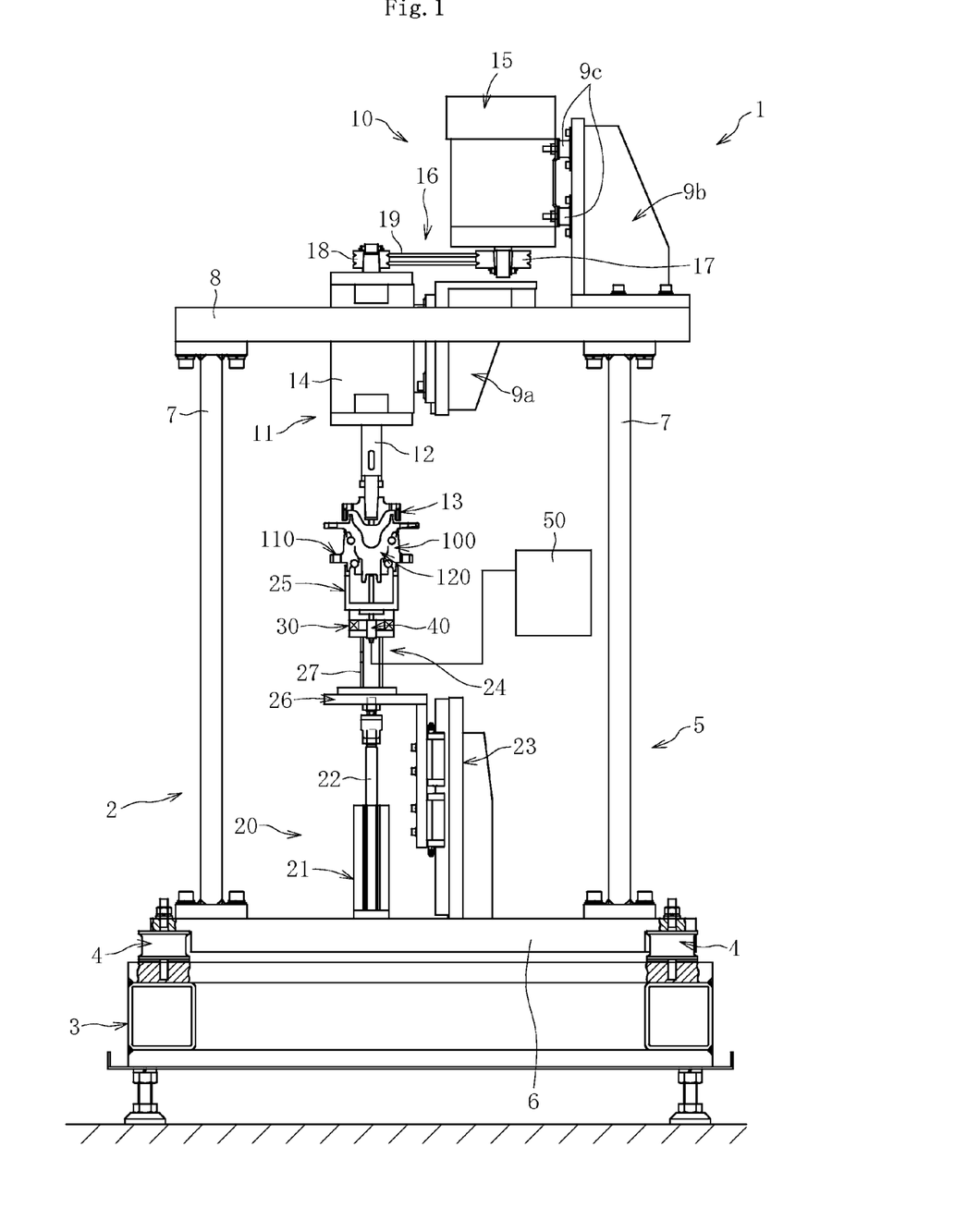
FIG. 1 is an overall schematic view for illustrating an inspection device according to an embodiment of the present invention.

FIG. 1 is an illustration of overall schematic structure of an inspection device 1 according to an embodiment of the present invention. The inspection device 1 illustrated in FIG. 1 is used for measuring and detecting vibration generated along with relative rotations between an outer member 110 and an inner member 120 of a rolling bearing 100 exemplified in FIG. 2 about axial centers thereof (in this embodiment, the inner member 120 is rotated under a state in which the outer member 110 is restricted from being rotated), and determining, based on values obtained through the detection, whether or not the rolling bearing is an accepted product. The inspection device 1 comprises, as main components, a structure 2, rotary drive means 10, pressurizing means 20, detecting means 40, and acceptance/rejection determination means 50 connected thereto. Although not shown in detail, this inspection device 1 is used under a state of being installed in a production line for mass-producing rolling bearings. Thus, at the time of actually using the inspection device 1, other manufacturing apparatus such as an assembly apparatus are installed adjacently around the inspection device 1.

Figure 2:
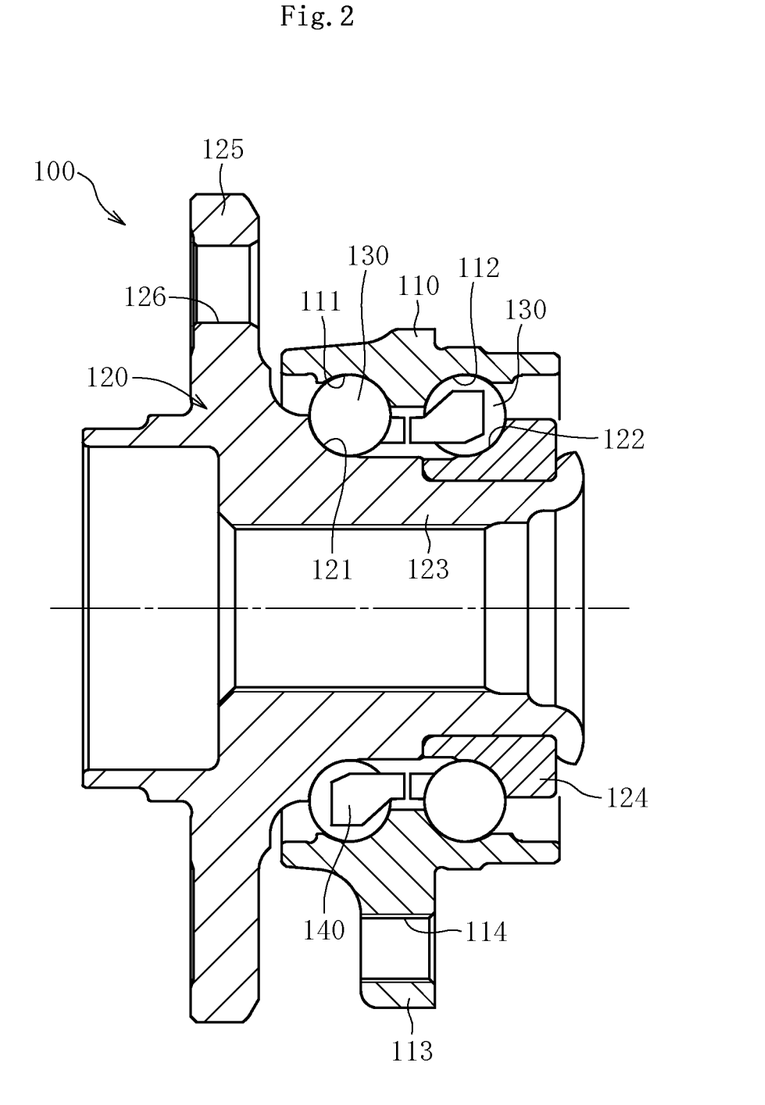
FIG. 2 is a sectional view for illustrating an example of a rolling bearing being an object to be inspected.

Note that, for the sake of convenience of description of a detailed structure of the inspection device 1, detailed description is made of an example of the rolling bearing being an object to be inspected with reference to FIG. 2. The rolling bearing 100 illustrated in FIG. 2 is a double-row ball bearing of a wheel bearing device for vehicles such as an automobile, which is configured to support a wheel in a freely rotatable manner with respect to a vehicle body. The rolling bearing 100 comprises the outer member 110 having double-row outer raceway surfaces 111 and 112 along an inner circumference thereof, the inner member 120 having double-row inner raceway surfaces 121 and 122 along an outer circumference thereof, balls 130 serving as rolling elements interposed between the raceway surfaces in pairs, and a cage 140 configured to equiangularly hold the balls 130. The outer member 110 integrally comprises flanges 113 extending radially outward, and a hole portion 114 to which a fastening member such as a bolt is mounted at the time when the outer member 110 is mounted to the vehicle body is formed through each of the flanges 113. The inner member 120 is formed by fitting a second inner member 124 along an outer circumference of a first inner member (also referred to as "hub wheel") 123 comprising flanges 125 extending radially outward. The inner raceway surfaces 121 and 122 are formed respectively on radially outer surfaces of the first inner member 123 and the second inner member 124. A hole portion 126 to which the fastening member such as a bolt is mounted at the time when the inner member 120 is fixed to a wheel is formed through each of the flanges 125 of the first inner member 123.

Figure 3:
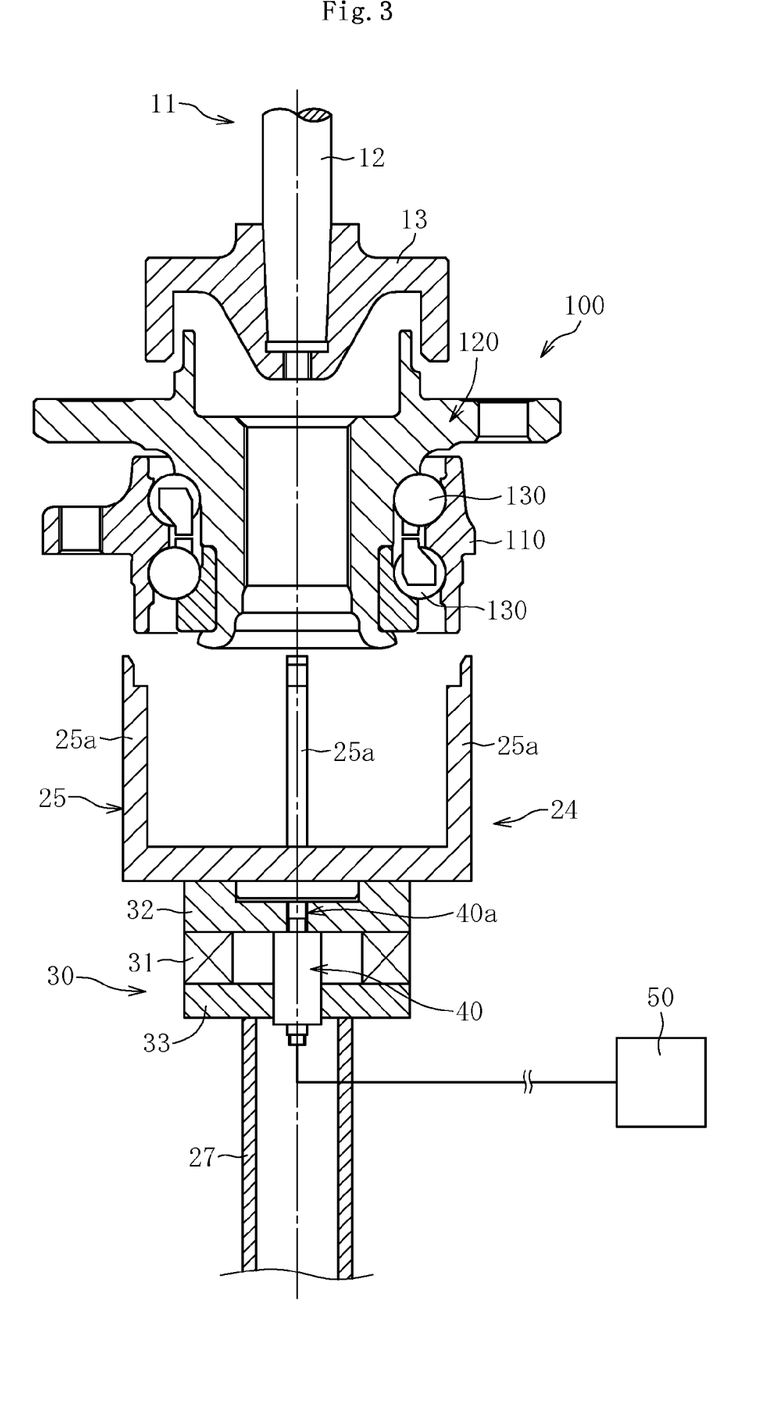
FIG. 3 is an enlarged view for illustrating a state in which a main part of the inspection device illustrated in FIG. 1 is disassembled.

Now, also with reference to FIG. 3, description is made of the detailed structure of the inspection device 1 illustrated in FIG. 1. Note that, the rolling bearing 100 illustrated in FIG. 1 and FIG. 3 corresponds to that illustrated as an example of the object to be inspected in FIG. 2, and this rolling bearing 100 is schematically illustrated in FIG. 1.

The structure 2 comprises a frame member 5 configured to hold the rotary drive means 10 and the pressurizing means 20 in a fixed manner, a support base 3 installed on a floor surface and configured to support the frame member 5 from below, and vibration control means 4 being "other vibration control means" interposed between the support base 3 and the frame member 5. The frame member 5 comprises a lower frame 6 fixed to ends on one side (upper ends) of the vibration control means 4, support posts 7 arranged upright at corner portions of the lower frame 6, and an upper frame 8 fixed to upper end portions of the support posts 7.

The vibration control means 4 being the "other vibration control means" of this structure are what is called vibration-proof rubbers arranged apart from each other and each comprising two mounting portions to be mounted respectively to different objects and a rubber portion interposed between both the mounting portions so as to couple both the mounting portions to each other and being deformable in shearing, compression, and tensile directions. The mounting portions on one side and another side of each of the vibration-proof rubbers are mounted respectively to the support base 3 and the frame member 5 (lower frame 6). As the vibration control means 4, there may be used not only the vibration-proof rubbers but also, for example, pneumatic dampers or hydraulic dampers.

The rotary drive means 10 is configured to rotate any one of the outer member 110 and the inner member 120 of the rolling bearing 100 being the object to be inspected (in this embodiment, the inner member 120) about the axial centers thereof (axial center of the rolling bearing 100). The rotary drive means 10 comprises a rotary holding mechanism 11 configured to hold the inner member 120 in a manner that the inner member 120 can be rotated about the axial center thereof, a motor 15, and a power transmission mechanism 16 configured to transmit output of the motor 15 to a driven shaft 12 of the rotary holding mechanism 11. The rotary holding mechanism 11 comprises a driven shaft 12 arranged coaxially with the rolling bearing 100 and rotatable by receiving the output of the motor 15, a holding member 13 mounted to a lower end portion of the driven shaft 12 and configured to hold the inner member 120 so that the inner member 120 can be rotated integrally with the driven shaft 12, and a fluid dynamic bearing (such as pneumatic spindle) 14 configured to support rotation of the driven shaft 12 (inner member 120) in a non-contact manner with respect to a stationary side. As the motor 15, there may be used a general purpose motor, a servo motor, or a stepping motor. The power transmission mechanism 16 comprises a first pulley 17 fixed to an output shaft of the motor 15, a second pulley 18 fixed to the driven shaft 12, and an endless power transmission member 19 looped around both the pulleys 17 and 18. As the power transmission member 19, there may be used a belt member, a chain, or a wire. In this case, a belt member having low frictional resistance against both the pulleys 17 and 18 (what is called a round belt) is used.

The entire rotary drive means 10 configured as described above is arranged above the rolling bearing 100 being the object to be inspected. The rotary holding mechanism 11 and the motor 15 are held in a fixed manner by the upper frame 8 of the frame member 5 respectively through intermediation of brackets 9a and 9b. Note that, in this embodiment, the motor 15 is mounted and fixed to the bracket 9b through intermediation of vibration control means 9c such as the vibration damping rubber.

The pressurizing means 20 is arranged apart from the rotary drive means 10. In this case, the entire pressurizing means 20 is arranged below the rolling bearing 100 being the object to be inspected. The pressurizing means 20 is arranged upright on the lower frame 6, and comprises a cylinder mechanism 21 comprising a rod 22 configured to extend and retract along an axial line of the rolling bearing 100 being the object to be inspected (vertical direction), and a guide mechanism 23 configured to guide the extension and the retraction of the rod 22 while restricting postural changes of a support member 24 (rolling bearing 100 being the object to be inspected) mounted and fixed to an upper end of the rod 22. Although not shown, the cylinder mechanism 21 of this embodiment is constructed by an electric cylinder comprising a ball screw, a linear guide, and an AC servo motor.

The support member 24 comprises a base plate 26 mounted and fixed to the distal end (upper end) of the rod 22, a support member 25 configured to support the outer member 110 in a contact manner from below, and a coupling portion interposed between the base plate 26 and the support member 25 so as to couple those members to each other. The coupling portion comprises a cylindrical intermediate member 27 installed on the base plate 26, and vibration control means 30 interposed between the intermediate member 27 and the support member 25 (also refer to FIG. 3).

The support member 25 is a member configured to support the outer member 110 of the rolling bearing 100 being the object to be inspected in a contact manner from below. The support member 25 of this embodiment is formed into such a shape as to be capable of supporting (supporting in a contact manner) the outer member 110 of the rolling bearing 100 at three circumferential positions. Specifically, the support member 25 comprises axial portions 25a extending in the vertical direction and arranged apart from each other at the three circumferential positions of the rolling bearing 100 (outer member 110). Thus, the outer member 110 of the rolling bearing 100 is supported in a contact manner from below by the axial portions 25a arranged apart from each other at the three circumferential positions.

The vibration control means 30 comprises a vibration control member 31, and a first holding member 32 and a second holding member 33 arranged respectively on both an upper side and a lower side of the vibration control member 31. The first holding member 32 is interposed between the vibration control member 31 and the support member 25, and holds substantially one end portion of the detecting means 40. The second holding member 33 is interposed between the vibration control member 31 and the intermediate member 27, and holds substantially another end portion of the detecting means 40. In this way, the first holding member 32 and the second holding member 33 serve as a holding portion configured to hold the detecting means 40 in a fixed manner. The vibration control member 31 to be used may be of any type as long as a vibration control function (function to damp/reduce vibration) can be exerted. For example, there may be used not only what is called the vibration-proof rubber described above, but also an elastic member formed into a circular portion (member obtained by forming a rubber, an elastic resin, or the like into a circular shape).

In this embodiment, an acceleration sensor configured to detect accelerations is used as the detecting means 40. The acceleration sensor to be used may be of any one of a mechanical type, an optical type, and a solid state type. Among them, an acceleration sensor of the solid state type is preferred due to its smaller size and weight, and higher detection accuracy than those of an acceleration sensor of the mechanical type and an acceleration sensor of the optical type. As examples of the acceleration sensor of the solid state type, there may be given an acceleration sensor of a capacitance detection type, which is configured to detect variation in position as variation in capacitance, an acceleration sensor of a piezoresistive type, which is configured to utilize a piezoresistive effect, and an acceleration sensor of a gas temperature distribution type. The acceleration sensor serving as the detecting means 40 may be of such a contact type as to bring a detecting element 40a (acceleration pickup) arranged at the one end portion thereof into contact with an object to be measured, or such a non-contact type as to be arranged in proximity to the object to be measured. In this embodiment, the detecting element 40a is held in a fixed manner by the holding portion of the vibration control means 30 so as to be brought into contact with or proximity to the support member 25 configured to support the outer member 110 in a contact manner from below. The acceptance/rejection determination means 50 is connected with wires to the acceleration sensor serving as the detecting means 40. The acceptance/rejection determination means 50 is configured to determine, based on values obtained through detection by the detecting means 40, whether the rolling bearing 100 being the object to be inspected is an accepted product (non-defective product) or a rejected product (defective product).

Note that, instead of the acceleration sensor described above as the detecting means 40, there may be used a speed sensor configured to detect speeds, or a displacement sensor configured to detect displacements. As the speed sensor, there may be used a laser Doppler vibrometer. Further, as the displacement sensor, there may be used a laser displacement sensor, an eddy current displacement sensor, and a contact displacement sensor. Specifically, in order to quantitatively grasp vibration, any one of physical quantities of an acceleration ($m/s^2$), a speed (m/s), or a displacement (m) is used, and those physical quantities can be converted to each other through differentiation or integration. Thus, as described above, the speed sensor or the displacement sensor may be used instead of the acceleration sensor serving as the detecting means 40.

The inspection device 1 configured as described above is used, for example, as follows.

First, under a state in which the rolling bearing 100 being the object to be inspected is in a posture that the axial line thereof is parallel to an extension-and-retraction direction of the rod 22 of the cylinder mechanism 21, the outer member 110 is placed onto the axial portions 25a of the support member 25. With this, the rolling bearing 100 (outer member 110) is supported by the support member 25 in a contact manner from below. Then, the rod 22 of the cylinder mechanism 21 is extended and moved until an end surface of each of the flanges 125 of the inner member 120 abuts against the holding member 13 of the rotary holding mechanism 11. Next, an extension amount of the rod 22 is adjusted so as to pressurize the outer member 110 upward (toward the inner member 120). With this, the outer member 110 is pressed against the inner member 120 with a predetermined force (specifically, approximately 250 N). In this state, the motor 15 is driven to rotate the driven shaft 12 and the holding member 13 of the rotary holding mechanism 11 integrally with each other. With this, under a state in which the outer member 110 is restricted from being rotated about the axial center thereof, the inner member 120 is rotated about the axial center thereof. Then, when the vibration generated in the outer member 110 along with the rotation of the inner member 120 is measured and detected by the acceleration sensor serving as the detecting means 40 through intermediation of the support member 25, values obtained through the detection (measured values) are input to the acceptance/rejection determination means 50. The acceptance/rejection determination means 50 determines whether or not accelerations at predetermined frequencies fall within ranges of preset acceptance criteria (are equal to or less than thresholds). When an acceleration input to the acceptance/rejection determination means 50 is equal to or less than the threshold, the acceptance/rejection determination means 50 outputs a determination of "ACCEPTED." Meanwhile, when this acceleration is more than the threshold, the acceptance/rejection determination means 50 outputs a determination of "REJECTED."

As described above, in the inspection device 1 according to the present invention, the pressurizing means 20 for pressurizing the outer member 110 toward the inner member 120, and the rotary drive means 10 for rotating the inner member 120 about the axial center thereof are arranged apart from each other. In addition, the vibration control means 30 is interposed between the outer member 110 and the pressurizing means 20. With this, vibration generated due to the drive of the rotary drive means 10, and vibration generated in the other apparatus arranged adjacently to the inspection device 1 are less liable to be transmitted to the outer member 110 being a substantial object to be inspected. Further, the detecting means 40 is held in a fixed manner by the holding portion provided in the vibration control means 30, and hence vibration of the detecting means 40 itself can be prevented as much as possible. In this way, according to the configuration of the present invention, both the rolling bearing 100 being the object to be inspected (outer member 110) and the detecting means 40 can be effectively suppressed from being influenced by disturbance vibration. Thus, vibration characteristics of the rolling bearing 100 can be inspected with high accuracy.

In this embodiment, the vibration generated in the outer member 110 is detected by the detecting means 40 through intermediation of the support member 25 configured to support the outer member 110. The support member 25 used in this embodiment supports the outer member 110 in a contact manner at a plurality of (three in this embodiment) circumferential positions. With this, the vibration of the rolling bearing 100 is efficiently transmitted to the support member 25, and hence the vibration characteristics can be detected with higher accuracy.

Further, in this embodiment, the rotation of the inner member 120 (driven shaft 12) is supported by the fluid dynamic bearing such as the pneumatic spindle. With this, deterioration in inspection accuracy of the vibration characteristics, which may occur when the driven shaft 12 is supported by the rolling bearing in a rotatable manner, can be prevented as much as possible. Further, in the power transmission mechanism 16 configured to transmit the output of the motor 15 to the driven shaft 12 (inner member 120), the power transmission member 19 (endless belt member) having low frictional resistance against the pulleys 17 and 18 is used. Thus, a risk in that vibration is generated from the power transmission mechanism 16 is reduced as much as possible. With this, the vibration characteristics can be inspected with higher accuracy.

Still further, in this embodiment, the other vibration control means (vibration control means 4) are interposed between the frame member 5 configured to hold the pressurizing means 20 and the rotary drive means 10 in a fixed manner, and the support base 3 configured to support the frame member 5 from below. In addition, the motor 15 of the rotary drive means 10 is mounted and fixed to the bracket 9c (frame member 5) through intermediation of the vibration control means 30. Thus, vibration generated inside and outside the inspection device 1 is much less liable to be transmitted to the rolling bearing 100 being the object to be inspected and the detecting means 40. With this, the vibration characteristics of the rolling bearing can be inspected with much higher accuracy.

The inspection device 1 according to the embodiment of the present invention is described above, but various modifications may be made to the inspection device 1 without departing from the gist of the present invention. For example, instead of the electric cylinder employed as the cylinder mechanism 21 of the pressurizing means 20 in the embodiment described above, there may be employed a pneumatic cylinder or a hydraulic cylinder. Further, instead of the cylinder mechanism 21 of the pressurizing means 20, which functions substantially as a mechanism configured to apply a pressing force to the outer member 110, there may be employed a spring mechanism comprising a coil spring. Note that, when the cylinder mechanism 21 is employed, the pressing force to be applied to the outer member 110 can be adjusted only by adjusting an amount of the extension and the retraction (stationary position) of the rod 22. Thus, there is an advantage of high compatibility with changes in type of the rolling bearing 100 being the object to be inspected.

Further, the detection of the vibration of the rolling bearing 100 by the detecting means 40 need not necessarily be performed indirectly through intermediation of the support member 25, and may be directly performed by bringing the detecting element 40a into contact with the rolling bearing 100 (outer member 110) or arranging the detecting element 40a in proximity to the rolling bearing 100. In this case, the axial portion 25a of the support member 25 formed into a cylindrical shape may be used that the axial portion 25a supports the outer member 110 in a contact manner over an entire circumference thereof.

In addition, the inspection device 1 according to the present invention may be used not only for inspecting vibration characteristics of the double-row ball bearing as exemplified in FIG. 2, but also preferably for inspecting vibration characteristics of other well-known double-row rolling bearings such as a double-row needle roller bearing, and a double-row cylindrical roller bearing. Further, the inspection device 1 according to the present invention may be used also preferably for inspecting vibration characteristics of single-row rolling bearings.

Figure 4:
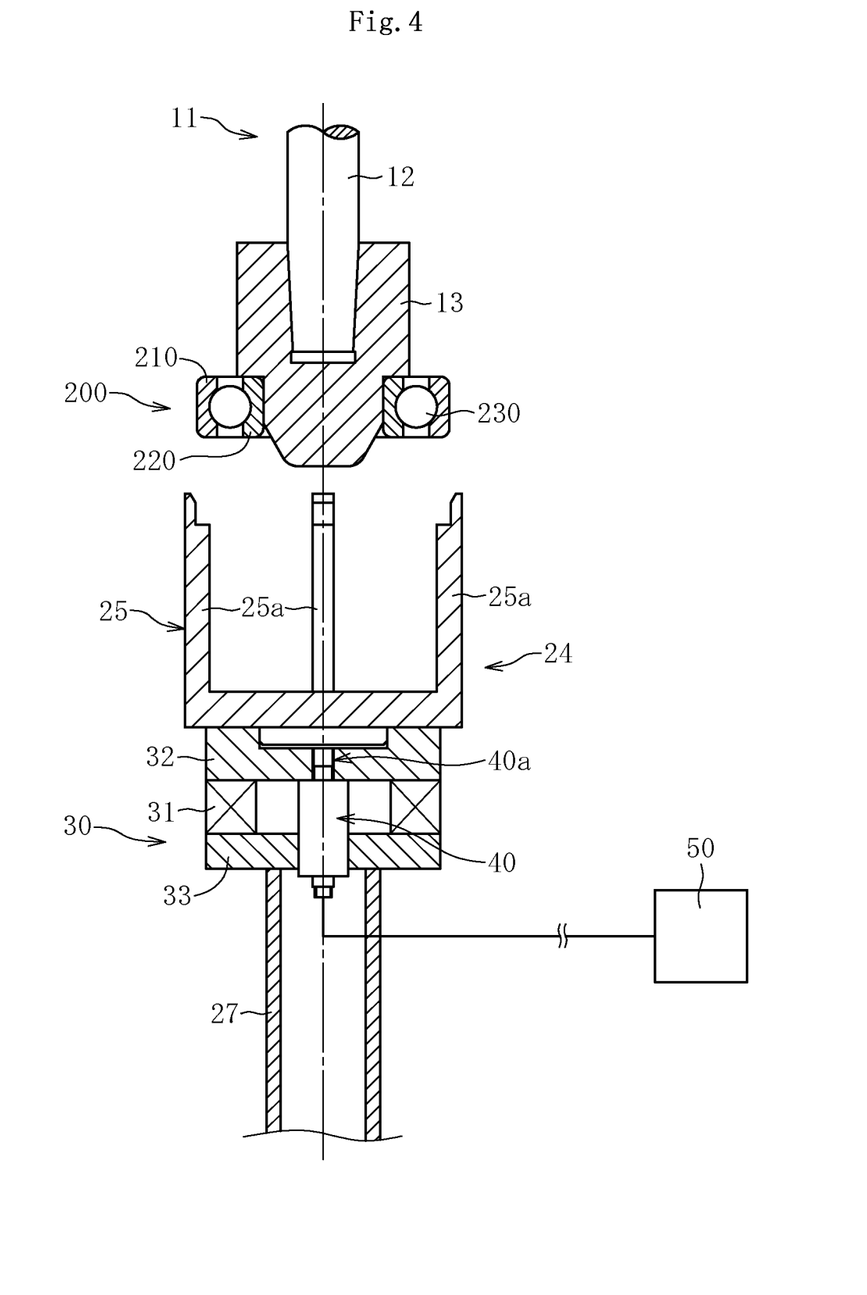
FIG. 4 is an enlarged view for illustrating a main part of an inspection device according to another embodiment.

As an example, a main part of the inspection device 1 configured to inspect vibration characteristics of a single-row rolling bearing (deep groove ball bearing in the illustrated example) 200 is illustrated in the enlarged view of FIG. 4. The rolling bearing 200 illustrated in FIG. 4 comprises an outer ring 210 serving as an outer member having an outer raceway surface along an inner circumference thereof, an inner ring 220 serving as an inner member having an inner raceway surface along an outer circumference thereof, and balls 230 serving as rolling elements interposed between the raceway surfaces in a pair. In the inspection device 1 of this embodiment, the holding member 13 configured to hold the inner ring 220 in a manner that the inner ring 220 can be rotated together with the driven shaft 12 comprises a press-fit portion to be press-fitted along an inner circumference of the inner ring 220.

In the inspection device 1 described above, the inner member is driven and rotated under the state in which the outer member is pressurized toward the inner member (state in which the outer member is restricted from being rotated), and the vibration generated along with this rotation is detected by the detecting means 40. However, in contrast to this configuration, vibration generated by driving and rotating the outer member under a state in which the inner member is pressurized toward the outer member (state in which the inner member is restricted from being rotated) may be detected by the detecting means 40. In order to employ such a configuration, it is only necessary to change the shape of the support member 25 such that the inner member can be supported in a contact manner from below, and to change a shape of the holding member 13 such that the outer member can be held.

REFERENCE SIGNS LIST 1 inspection device
2 structure
3 support base
4 vibration control means (other vibration control means)
5 frame member
10 rotary drive means 11 rotary holding mechanism
14 fluid dynamic bearing
15 motor
16 power transmission mechanism
20 pressurizing means
21 cylinder mechanism
22 rod
25 support member
30 vibration control means
40 detecting means
40a detecting element
50 acceptance/rejection determination means
100 rolling bearing
110 outer member
120 inner member
130 ball (rolling element)

The invention claimed is:

1. An inspection device, comprising:
pressurizing means for pressurizing one of an outer member and an inner member of a rolling bearing, the one of the outer member and the inner member being supported by a support member in a contact manner from below, toward another one of the outer member and the inner member,
the rolling bearing comprising:
rolling elements; and
the outer member and the inner member rotatable relative to each other through intermediation of the rolling elements;
rotary drive means arranged apart from the pressurizing means, for rotating the another one of the outer member and the inner member about an axial center of the another one of the outer member and the inner member under a state in which the one of the outer member and the inner member is pressurized toward the another one of the outer member and the inner member;
detecting means for detecting vibration generated in the one of the outer member and the inner member along with the rotation of the another one of the outer member and the inner member through intermediation of the support member so that whether or not the rolling bearing is an accepted product is determined based on values obtained through the detection;
a frame member configured to hold the pressurizing means and the rotary drive means in a fixed manner; and
vibration control means which are respectively interposed between the frame member and a motor constituting the rotary drive means and between the support member and the pressurizing means,
wherein the vibration control means which is interposed between the support member and the pressurizing means comprises:
a vibration control member;
a first holding member arranged at an upper side of the vibration control member in contact with the vibration control member; and
a second holding member arranged at a lower side of the vibration control member in contact with the vibration control member, and
wherein one end portion of the detecting means is held in a fixed manner by the first holding member, and another end portion of the detecting means is held in a fixed manner by the second holding member.

2. The inspection device according to claim 1, wherein a detecting element of the detecting means is in contact with or in proximity to the support member.

3. The inspection device according to claim 1, wherein the support member is formed into a shape capable of supporting the one of the outer member and the inner member at a plurality of circumferential positions.

4. The inspection device according to claim 1, wherein the rotary drive means comprises a fluid dynamic bearing configured to support the rotation of the another one of the outer member and the inner member in a non-contact manner with respect to a stationary side.

5. The inspection device according to claim 1, further comprising:
a support base configured to support the frame member from below; and
other vibration control means interposed between the frame member and the support base.

6. The inspection device according to claim 1, wherein the detecting means comprises any one of an acceleration sensor, a speed sensor, and a displacement sensor.

7. The inspection device according to claim 1, wherein the pressurizing means comprises a cylinder mechanism configured to extend and retract along an axial line of the rolling bearing.

8. An inspection device, comprising:
pressurizing means for pressurizing one of an outer member and an inner member of a rolling bearing, the one of the outer member and the inner member being supported by a support member in a contact manner, toward another one of the outer member and the inner member,
the rolling bearing comprising:
rolling elements; and
the outer member and the inner member rotatable relative to each other through intermediation of the rolling elements;
rotary drive means arranged apart from the pressurizing means, for rotating the another one of the outer member and the inner member about an axial center of the another one of the outer member and the inner member under a state in which the one of the outer member and the inner member is pressurized toward the another one of the outer member and the inner member;
detecting means for detecting vibration generated in the one of the outer member and the inner member along with the rotation of the another one of the outer member and the inner member through intermediation of the support member so that whether or not the rolling bearing is an accepted product is determined based on values obtained through the detection;
a frame member configured to hold the pressurizing means and the rotary drive means in a fixed manner; and
vibration control means which are respectively interposed between the frame member and a motor constituting the rotary drive means and between the support member and the pressurizing means,
wherein the vibration control means which is interposed between the support member and the pressurizing means comprises:
a vibration control member;
a first holding member arranged at a first side of the vibration control member in contact with the vibration control member; and
a second holding member arranged at a second side of the vibration control member in contact with the vibration control member, the second side of the vibration control member being opposite to the first side of the vibration control member, and wherein one end portion of the detecting means is held in a fixed manner by the first holding member, and another end portion of the detecting means is held in a fixed manner by the second holding member.

9. The inspection device according to claim 8, wherein a detecting element of the detecting means is in contact with or in proximity to the support member.

10. The inspection device according to claim 8, wherein the support member is formed into a shape capable of supporting the one of the outer member and the inner member at a plurality of circumferential positions.

11. The inspection device according to claim 8, wherein the rotary drive means comprises a fluid dynamic bearing configured to support the rotation of the another one of the outer member and the inner member in a non-contact manner with respect to a stationary side.

12. The inspection device according to claim 8, further comprising:
a support base configured to support the frame member; and
other vibration control means interposed between the frame member and the support base.

13. The inspection device according to claim 8, wherein the detecting means comprises any one of an acceleration sensor, a speed sensor, and a displacement sensor.

14. The inspection device according to claim 8, wherein the pressurizing means comprises a cylinder mechanism configured to extend and retract along an axial line of the rolling bearing.

* * * * *